United States Patent [19]

Chirafisi et al.

[11] 4,269,864

[45] May 26, 1981

[54] MILK REPLACER FOR CARAMELS

[75] Inventors: Dominick J. Chirafisi, Bronx; Nicholas Melachouris, White Plains, both of N.Y.

[73] Assignee: Stauffer Chemical Company, Westport, Conn.

[21] Appl. No.: 74,218

[22] Filed: Sep. 10, 1979

Related U.S. Application Data

[63] Continuation of Ser. No. 974,207, Dec. 28, 1978, abandoned, which is a continuation of Ser. No. 859,409, Dec. 12, 1977, abandoned, which is a continuation-in-part of Ser. No. 700,285, Jun. 28, 1976, abandoned.

[51] Int. Cl.$^3$ .................... A23C 21/00; A23C 11/00; A23G 3/32
[52] U.S. Cl. .................... 426/583; 426/580; 426/588; 426/657; 426/660
[58] Field of Search .............. 426/583, 580, 588, 660, 426/657

[56] References Cited

U.S. PATENT DOCUMENTS

| 3,677,771 | 7/1972 | Kolar, Jr. ................. 426/660 X |
| 3,730,735 | 5/1973 | Rash, Jr. et al. .......... 426/660 X |

OTHER PUBLICATIONS

Lees, R., Manufacture of Caramel, Food Manufacture, Mar. 1973 (pp. 45, 46 & 50).
Webb, et al., By Products from Milk, 2nd ed. The Avi Publishing Co., Inc., Westport, Conn., 1970 (pp. 295-303).

*Primary Examiner*—David M. Naff
*Attorney, Agent, or Firm*—Paul J. Juettner

[57] ABSTRACT

An improved milk replacer for caramels is provided comprising 13.75% to 17.25% whey protein from a whey protein concentrate, 35-45% dry whey solids, and 8-12% sodium caseinate. The milk replacer is an effective dry substitute for the milk solids normally used in preparing high quality caramels. Caramels of equivalent quality are provided.

28 Claims, No Drawings

MILK REPLACER FOR CARAMELS

CROSS REFERENCE TO RELATED APPLICATION

The present application is a continuation of U.S. Ser. No. 974,207, filed Dec. 28, 1978 which was a continuation of U.S. Ser. No. 859,409, filed Dec. 12, 1977 which was a continuation-in-part of parent application U.S. Ser. No. 700,285, filed June 28, 1976, all now abandoned.

BACKGROUND OF THE PRESENT INVENTION

The present invention relates to an improved milk solids replacer for the production of a caramel-type confectionery product.

Caramels are a highly desirable and useful confectionery product which are produced by the caramelization of sugar generally in the presence of milk solids, fat, and minor amounts of other materials to produce a soft, pliable confectionery product of a pleasingly chewable quality. A typical high quality caramel recipe includes a reducing sugar such as glucose, sucrose, milk solids, fat, butter, salt, flavoring and emulsifier. Caramels not only make pleasing and desirable confectionery products in and of themselves but also are highly desirable as an ingredient of other confectionery products as for example, a candy bar which incorporates chocolate, fudge, nougat, etc. or other types of confectionery materials.

There are two types of caramels, one of high quality prepared from milk solids, sugar and fat and the second of lesser quality and more economical prepared using starch and lower quantities of milk solids protein and fat. The starch gives body and shortness to the caramel. Lower milk levels can be used since starch replaces the functionality of the milk. Most milk replacers for caramels would find use in starch caramels as this caramel is more tolerant of recipe substitution. However, the high quality caramel (the true caramel), generally wrapped in individual bite sized pieces, is more sensitive to recipe changes than the starch caramel.

Caramels are prepared by caramelizing sugar in the presence of milk solids. Milk protein is a major contributor to the texture, body and flavor of the caramel. The browning reaction which takes place during the manufacture of the caramel arises from a reaction between the milk protein and reducing sugars during the cooking of the caramel mix. The casein in the milk protein contributes body to the caramel. If condensed whey is used, sodium caseinate can be added to increase the body of the caramels (R. Lees, Food Manufacture, March 1973 pp. 45, 46 and 50).

The quality of a caramel is influenced by many factors including variation in the ingredients. An assessment of the quality of the caramel includes an examination of color, flavor, texture, chew smoothness, degree of graining, external stickiness, flow characteristics, behavior under pressure and equilibrium relative humidity. The texture can be assessed in three stages: (a) standup properties (the ability of the caramel to retain its shape without flowing while standing on edge under humid conditions); (b) initial bite and (c) chewing characteristics. In determining initial bite characteristics, one looks for the degree of stringyness of the caramel. If the caramel breaks cleanly, it is referred to as short. Shortness is an essential quality of a good caramel.

There are two basic types of caramels, grained and ungrained. The grained caramel has a fine crystal matrix of sugar dispersed in the high sugar syrup phase which also contains fat globules. Crystallization is limited to less than 8% of the sugar. The presence of reducing sugars such as glucose or corn syrup in the caramel mix has an inhibiting effect on the crystallization of sucrose.

Commercial caramels are produced in general by the caramelization of sugar in the presence of liquid condensed milk, or sweetened condensed milk. However, these commercial processes for the production of caramels utilizing liquid condensed milk formulas suffer from certain economic disadvantages in that the milk or condensed milk employed must be refrigerated or otherwise maintained prior to use in order to prevent deterioration thereof. This not only adds to the cost of producing the caramels but likewise reduces the quality thereof. Although skim milk products in liquid form have also been used in the production of caramels, it is necessary to add butter or vegetable fat to the caramel mixture in order to impart body to the product following caramelization, and skim milk products still require special storage thereof.

The use of dried reconstitutable milk powder in high quality caramels would be advantageous as such use would eliminate the need for refrigeration.

One of the disadvantages of using dried reconstitutable milk powder in producing caramels is the "pudding-like" texture with poor flow properties which results in such caramels as opposed to the flowable, pliable properties normally considered desirable in caramel-type products.

Canadian Patent No. 959,334 overcomes this problem by adding a predetermined quantity of a sequestering agent to the milk or the reconstitutable product prior to the caramelization reaction. The flow properties of the caramel produced is remarkably improved and the "pudding-like" texture is accordingly prevented.

It would, however, be desirable to provide a milk replacer in dried form which did not require the use of the sequestering agent.

It is known to combine sweet whey, whey protein concentrate and sodium caseinate in connection with a flavor enhancer for use in providing a dairy flavor in such products as caramels wherein the milk solids have been replaced. This flavor enhancer is taught to contain 18.5% protein, 61% lactose, 4.1% fat and 9.2% minerals. This product is not taught to be useful as a milk solids replacer.

It is also known that milk solids in caramels can be replaced with a codried blend of sweet whey and sodium caseinate. The product has about 20% protein, 66% lactose, 1% fat and 9% mineral. This product has insufficient protein and too much lactose to be usable in preparing high quality caramels.

It is also known that non-fat dry milk solids in caramels can be replaced with a composition including vegetable fat, corn syrup solids, sodium caseinate, sucrose, dipotassium phosphate, distilled propylene glycol monostearate, mono and diglycerides, sodium silicoaluminate, salt, carrageenan, artificial flavor and color. In addition to all these ingredients, the manufacturer recommends utilizing ¾ parts dry whey to every part of the non-fat dry milk replacer. A more desirable milk replacer would have fewer ingredients and supply all the dairy derived protein needed for the caramels.

BRIEF SUMMARY OF THE PRESENT INVENTION

In accordance with the present invention there is provided a new milk replacer for use in preparing high quality caramels comprising:

| | |
|---|---|
| (a) dry whey solids | from about 35% to about 45%, |
| (b) sodium caseinate | from about 8% to about 12%, |
| (c) a whey protein concentrate | remainder in an amount sufficient to provide from the concentrate from about 13.75% to about 17.25% by weight whey protein. |

All percentages are by weight based on the total combined weight of the dry whey solids, the caseinate and the whey protein concentrate.

The whey protein concentrate and the lactose can be conveniently provided by using from about 45% to about 55% of a whey protein concentrate having about 31% whey protein.

The milk replacer of the present invention can be used to replace the milk solids in any caramel recipe and particularly in a high quality caramel recipe on a gram for gram basis while providing an equivalent caramel.

DETAILED DESCRIPTION OF THE PRESENT INVENTION

The compositions of the present invention comprises from about 35% to about 45% dry whey solids and from about 8% to about 12% caseinate with the remainder being made up by a whey protein concentrate in an amount sufficient to provide from about 13.75% to 17.25% protein. Based on the minimum remainder of 43% (35% and 8%) and maximum remainder of 57% (45% and 12%), the minimum concentration of whey protein in the whey protein concentrate which will provide 13.75% protein is about 24% by weight based on the weight of the concentrate and the maximum which will provide 17.25% protein is about 40% by weight based on the concentrate. A whey protein concentrate is defined as a product having an increased ratio of protein to lactose over that normally obtained in dry whey (from 12-13% protein). A whey protein concentrate is defined herein as any product having from about 24% to about 40% whey protein. The whey protein concentrate can be prepared by any known method normally utilized in concentrating the whey protein. Such methods include ultrafiltration and gel permeation separation as disclosed in U.S. Pat. No. 3,547,900, now Reissue Patent No. 27,806, and any other method that can be used to concentrate whey protein. As an example, whey clarified by passing the same through a centrifuge to remove large particles, is treated with calcium ion to remove sludge in accordance with the process outlined in Attebery U.S. Pat. No. 3,560,219. After removal of the sludge, the remaining material is concentrated to crystallize the lactose. After removal of the crystallized lactose, the remaining mother liquor is fed into a gel bed, where under centrifugal force, a protein rich fraction is separated from a lactose and ash rich fraction. The protein rich fraction is then subjected to spray drying to provide a material which can be used in the present invention. This is one of the preferred materials though any whey protein concentrate which has a reduced quantity of lactose and ash relative to the whey protein and an increased ratio of whey protein to lactose and ash over the ratios of the three ingredient in natural whey can be usable.

The whey protein concentrate can also be prepared by neutralizing acid (cottage) whey to remove sludge and clarify the whey, delactosing the remaining clarified liquid and ultrafiltering the clarified delactosed mother liquor to provide a protein rich retentate. This is spray dried to provide a whey protein concentrate.

A whey protein concentrate having the necessary whey protein concentrate can be prepared directly by one of the methods described hereinbefore or by adding lactose to a whey protein concentrate having more than about 40% protein to dilute the protein to the required level. The lactose can be blended with the concentrate before forming the compositions of the present invention or as the compositions are prepared either as an additive or as ingredients to a caramel mix. As used herein, the term "whey protein concentrate" is intended to include products derived directly by concentration processes as well as products derived by blending a concentrate with lactose provided that the final concentration of protein falls within the range of from about 24% to about 40% protein based on the combined weight of the concentrate and the lactose.

It is particularly preferred to utilize a whey protein concentrate having 31% protein. This is sold as ENR-PRO 31 from Stauffer Chemical Company, Westport, Connecticut. This product can be prepared by gel permeation or ultrafiltration separation techniques using a set of conditions which are sufficient to provide a product of 31% protein. In the alternative, whey protein concentrates with a higher protein content can be mixed with lactose to provide a product of 31% whey protein as described hereinbefore. As an example, 100 parts of a concentrated whey protein product having 50% whey protein such as ENRPRO 50 available fromm Stauffer Chemical Company, Westport, Conn., can be blended with 60 parts of lactose to provide a product having a whey protein concentrate of approximately 31% protein. The foregoing are given as illustrative of products which can be used in accordance with the present invention. Other commercial products having different protein concentrations can be utilized as long as the final recipe has the ratio of components specified hereinbefore, i.e., 13.75% to 17.25% whey protein content.

Blends of whey protein concentrates with lactose to reduce the total amount of whey protein content can be prepared prior to the manufacture of the milk replacer or at the time the milk replacer is prepared. The milk replacer can be prepared as part of the manufacturing procedure for preparing caramels.

The dry whey solids which form a part of the milk replacer of the present invention are generally obtained by drying the whey derived from the manufacture of various cheeses such as cheddar, mozzarella, swiss and the like. The preferred wheys are dried sweet wheys such as dried cheddar cheese whey. Sweet wheys are those whey derived from the manufacture of cheese wherein the pH during the cheese manufacture does not drop below about pH 5.6. Blends of sweet whey with other wheys can also be utilized if desired. The dried whey solids are utilized in an amount of from about 35% to about 45% by weightbased on the total weight of the milk replacer. Preferably, the dried whey solids are utilized in an amount ranging from about 38% to about 43% by weight.

The milk replacer of the present invention also includes a caseinate salt of an alkali metal or alkaline earth metal such as sodium or calcium. This material is utilized in an amount of from about 8% to about 12% by weight. Preferably, the caseinate is sodium caseinate.

A portion of the formulation prepared utilizing whey protein concentrate may be satisfied with lactose. The lactose can be part of the whey protein concentrate or added separately. The only qualification is that the lactose which is added separately be of a food grade quality.

The milk replacer of the present invention can be manufactured separately and sold as an item of commerce to the caramel manufacture. All that is required is that the ingredients be dry blended in appropriate amount. If desired, the blend can be formed by mixing the ingredients in the presence of water, either added to the dry ingredients or as the water present during the manufacture. The liquefied blend can then be codried to from a homogenous mixture.

It is also within the scope of the present invention to allow the caramel manufacturer to compound the milk replacer as part of the process for manufacturing the caramels.

The milk replacer of the present invention can be used to replace the milk solids in a caramel recipe on a gram for gram basis. In a typical recipe which utilizes sweetened condensed milk of 28% milk solids, 42% sucrose and 30% water, the composition of the present invention can be utilized as a direct replacement for the 28% milk solids normally present in the sweetened condensed milk.

In a typical caramel containing 45.95% sweetened condensed milk, 39.9% corn syrup of dextrose, 9.2% fat and 5.47% sucrose, of which 12.87% of the total recipe is the milk solids from the sweetened condensed milk, the milk solids can be replaced with the milk replacer of the present invention. The sucrose which is present in the sweetened condensed milk in an amount of 42% of the sweetened condensed milk or 19.3% based on the total recipe is added to the total amount of sucrose which is needed in the recipe. The 30% water of the sweetened condensed milk or 13.97% based on the total recipe is added as an ingredient in the caramel manufacture. In this example, the final caramel recipe would comprise 12.87% of the milk replacer of the present invention, 39.39% dextrose, 9.2% fat, 24.77% sucrose and 13.9% water. The milk replacer of the present invention, as stated hereinbefore, is generally utilized to replace the total milk solids of a caramel recipe on a gram for gram basis. In general, this means that the product of the present invention is utilized in an amount within the range of from about 10% to about 14% by weight based on the total weight of the caramel recipe, the variation in percentage relating to the caramel recipe itself.

The caramels contain in addition to the milk solids of the present invention, a reducing sugar such as dextrose or corn syrup. This sugar assists in the carmelization reaction and is normally present in amounts ranging as high as 45% of the caramel.

Also, present in the caramel mixture is a sugar such as sucrose. This is generally present in an amount ranging from about 20% to about 30% and preferably about 25% of the caramel recipe. Sugar in various grades such as brown sugar can be utilized though it is preferred to utilize a pure crystallized and granulated sucrose from either a beet or sugar cane source.

In the production of caramels, the presence of fat imparts a creamy texture to the caramels as well as providing lubrication for the machinery used during mixing and spreading as well as on the consumer's teeth during chewing. The oil or fat ingredients that may be employed in the manufacture of caramels are primarily vegetable or animal fat in solid or liquid form. The particular fats employed are not critical and they constitute one or more of the following such as: soy oil, corn oil, cotton seed oil, coconut oil, sunflour oil, and the like. Controlled hydrogenation can provide a fat of specific degree of solidity. The degree of hydrogenation will vary somewhat depending upon the oils used and the exact nature of the product desired. Specifically, by varying the fraction of the oil hydrogenization or the degree of hydrogenation of part or all of the oil, the degree of whiteness and the degree of creaminess of the final product may be varied between that of fresh whole milk and fresh cream. As a guide, the hydrogenation is regulated so that the melting point of the total combined fat ingredient is within the range of from 25° C. to 40° C. and preferably from 30° C. through 36° C. The melting point of the fat should not be too high since the product will taste waxy. If the melting point of the fat is too low, the product will have an oil taste. Correct selection of the type of oil and degree of hydrogenation is well within those skilled in the art.

The caramels are generally prepared by introducing the dry ingredients into a blender and after sufficient mixing to insure uniformity, water and other liquid ingredients are added. The water is generally present in the caramel mixture in an amount from about 10% to about 15% by weight. The water can be added separately or as part of another ingredient such as in the use of liquid corn syrup. The source of the water is not critical since its prime purpose is to dissolve the sugars and serve as a medium for the caramelization reaction. The amount of water present is not critical within the limits given hereinbefore since the amount of water is related to the caramelization temperature. It is preferred to use as little amount of water as possible since the amount of water present dictates the time necessary for the reaction to reach the caramelization temperature.

It has also been found desirable to include with the milk replacer formulation of the present invention, from 1–5% by weight of an anti-foaming agent in the form of a food grade emulsifier. This additive reduces the foaming which has been encountered in using the milk replacer of the present invention in continuous as well as batch manufacturing techniques. Such food grade emulsifiers are typically mono- and diglycerides propylene glycol fatty acid esters, polyglycol fatty acid esters, sorbitan monostearate, polyoxyethylene sorbitan fatty acids such as a polyoxyethylene sorbitan monostearate, sodium stearoyl-2-lactylate, dioctyl sodium sulfosuccinate and the like and mixtures thereof. The preferred emulsifiers are the mono and diglycerides of fatty acid esters.

While the previously listed emulsifiers are preferred, a wide range of food grade emulsifiers can be used such as those listed under "Emulsifiers: Whipped and Foaming Agents" on page 103, of a book entitled, *Foods, Chemicals Codex*, 2nd Edition, published by the National Academy of Science, Washington, D.C. 1972 and the supplements thereto. That list of emulsifiers including those listed in the supplements is incorporated herein by reference. It is preferred to incorporate the emulsifier in an amount of from about 1% to about 5% by weight based on the total combined weight of the dry whey solids, the caseinate, the concentrate and the emulsifier. A preferred amount is from about 3% to about 5% by weight. In adding the emulsifier to the milk replacer of the present invention, the previously given percentages of sodium caseinate and whey protein concentrate are generally not changed. The amount of dried whey present is usually reduced to accommodate the presence of the emulsifier. A preferred amount of dried whey is between about 38% and 42% by weight.

The emulsifier which forms part of the milk replacer is generally added as part of the milk replacer or if the milk replacer is blended at the beginning of the procedure for preparing the caramels at the time of blending. This emulsifier is in addition to the emulsifier which is normally present in caramels to emulsify fat and which is added at a stage later than the addition of the milk replacer.

In preparing caramels with whey protein, two different types of foaming are encountered. The foaming during the cooking stage can be overcome by the addition of the anti-foaming agent as described hereinbefore. The second type of foaming occurs at the start of the cooking if the temperature of the kettle is raised rapidly as is common in commercial caramel manufacturing procedures which use high presssure steam to heat the kettles. This type of foaming can be overcome by blending the milk replacer with the water and preheating the mixture to about 55° C. to about 72° C. All of the remaining ingredients can then be added and the mix heated in normal fashion.

These anti-foaming effects of the preheating and/or the emulsifier can be used with any milk replacer for caramels which exhibits these problems of foaming in the manufacture stages. The emulsifier can be added in any anti-foamingly effective amount, generally from about 1% up to about 5% of the combined weight of the dry whey solids, the caseinate, the concentrate and the emulsifier. The most effective amount may vary from milk replacer to milk replacer and can be easily determined by one skilled in the art.

Various other materials may also be added to the mixture prior to caramelization to produce certain desirable characteristics in the caramels, for example, various emulsifiers such as lecithin or albumen or also glycerol monostearate and soy flour may be added to insure adequate emulsion of the fats besides contributing to the body of the caramels produced.

Also various other flavorings, colors, or ingredients such as almonds, coconuts or walnuts may be added to impart a desirable flavor or texture to the product.

The invention will be more fully illustrated in the examples which follow.

EXAMPLE 1

Control

A laboratory duplication of a commercial caramel was prepared using the following ingredients:

TABLE I

|  |  | Amount |  |
|---|---|---|---|
| Milk Solids | 12.06% | 5.187 | kg |
| Dried Whey | 0.8% | 0.0415 | kg |
| Glucose | 39.39% | 2.043 | kg |
| Fat | 9.19% | 0.478 | kg |
| Sucrose | 24.77% | 1.29 | kg |
| Water | 13.79% | .72 | kg |

The milk solids, dried whey, part of the sucrose and the water are added as part of a condensed milk which has the following composition:

| Milk Solids and Dried Whey | 28% |
|---|---|
| Sucrose | 42% |
| Water | 30% |

The ratio of the milk solids and dried whey in the sweetened condensed milk is the same as in the kettle recipe given above. The caramel was prepared by mixing together all of the ingredients and homogenizing the mixture at 154.84 kg/cm$^2$. After homogenization, the mix was cooked to 117° C. in 34 minutes in a steam jacketed kettle equipped with a scraper. The scraper speed was set on a medium speed sufficient to prevent buildup on the wall of the kettle. The cook appeared normal and provided an excellent caramel.

EXAMPLE 2

Three milk replacers were prepared on a pilot plant scale and tested in caramels against a control of sweetened condensed milk in a commercial caramel recipe using the following ingredients:

|  | CONTROL | | | |
|---|---|---|---|---|
|  |  | All Amounts in Kilograms | | |
|  | Control | 2A | 2B | 2C |
| Sweetened condensed Milk | 2.3835 | — |  |  |
| Sucrose (42%) | (1.0) | 1.0 | 1.0 | 1.0 |
| Water (30%) | (0.715) | 0.715 | 0.715 | .715 |
| Milk Solids (28%) | (0.6674) | — | — | — |
| Milk Replacer (28%) | — | 0.6674 | 0.6674 | 0.6674 |
| Whey Protein Concentrate | — | 0.3137(47%) | 0.3137(47%) | 0.267(40%) |
| Dried Whey | — | 0.2803(42%) | 0.267(40%) | 0.327(49%) |
| Sodium Caseinate | — | 0.6674(10%) | 0.06674(10%) | 0.06674(10%) |
| Emulsifier* | — | 0.2836 | 0.0201(3%) | 0.0067(1%) |
| Sucrose | 0.2836 | 0.2836 | 0.2836 | 0.2836 |
| Corn Syrup | 2.043 | 2.043 | 2.043 | 2.043 |

| | CONTROL | | | |
|---|---|---|---|---|
| | | All Amounts in Kilograms | | |
| | Control | 2A | 2B | 2C |
| Fat** | 0.4767 | 0.4767 | 0.4767 | 0.4767 |

(material in brackets added as part of the sweetened condensed milk)
*Emulsifier - Atmul 84 - mono- and diglycerides, Atlas Chemical Industries, Inc.
**Fat - Wibocoe S.W., coconut, Melting point 38.9° C.

All caramels were prepared using the procedure of Example 1 except where noted otherwise.

Evaluation in Make-up

Example 2A—Milk replacer dispersed very well, strained to remove small lumps, foamed somewhat in the kettle, cooked in 27½ minutes, some foaming as caramel was poured into pan, Example 2B—Milk replacer dispersed very well with very few lumps, no foaming in kettle cooked in 27½ minutes in manner comparable to control, poured in manner comparable to control with comparable viscosity.

Example 2C—Milk replacer dispersed very well, excessive foaming in the kettle, cooked in 27½ minutes.

Evaluation of Caramel.

Example 2A—Somewhat soft, stringy, not short, poor body.
Example 2B—Good body, short
Example 2C—Soft, stringy, not short

Evaluation of Control.

In cooking, the control was normal.
No foaming in the kettle, good final viscosity.
Caramel had good body, short, good standup, not soft, good color and taste.

EXAMPLE 3

Other caramels prepared in accordance with Example 2 from various blends of whey protein concentrate, dried whey and sodium caseinate provided results unacceptable in comparison with a control prepared in accordance with Example 1 as follows:

| | Percent by weight of the milk replacer | | | | | | |
|---|---|---|---|---|---|---|---|
| | 3a | 3b | 3c | 3d | 3e | 3f | 3g |
| Whey protein Concentrate (31% protein) | 25.5 | 37.5 | 44 | 55 | 20 | 36 | 40 |
| Dried Sweet Whey | 25.5 | 37.5 | 44 | 20 | 55 | 36.5 | 50 |
| Sodium Caseinate | 49% | 25 | 12 | 25 | 25 | 25 | 10 |
| Emulsifier* (see Ex. 2) | — | — | — | — | — | — | — |
| Results | A,C | B | C,D | B | C | C | F |

A = could not make caramel
B = difficult to pass through homogenizer due to high viscosity
C = grainy
D = not short
E = uneven color
F = excessive foaming

EXAMPLE 4

Caramels were prepared by a commercial caramel manufacturer using the recipe of Example 1, replacing the 28% milk solids with an equivalent weight of the following:

| | Example |
|---|---|
| Whey Protein Concentrate (31% Protein) | 47 |
| Dried Sweet Whey | 40 |
| Sodium Caseinate | 10 |
| Emulsifier* (See Example 2) | 3 |

A sample was run by the caramel manufacturer in preparing a caramel cook in his kettle. After blending, a steam line having 49.94 kg pressure was opened to heat the kettle. The mix foamed out of the kettle.

The example was repeated. The milk replacer was blended with the water and heated to approximately 60° C. All remaining ingredients were then added and the steam line turned on. No initial foaming was noted. The caramel cook proceeded in normal fashion.

EXAMPLE 5

A caramel was prepared utilizing 0.5654 parts of the whey protein concentrate, 0.5645 parts dried sweet when, 0.154 parts sodium caseinate, 3.94 parts glucose, 2.473 parts sucrose, 0.92 parts fat and 1.38 parts water. The whey protein concentrate, sweet whey, sodium caseinate were used to provide a ratio of 44% to 44% to 12%, respectively. The caramel was prepared by blending the dry ingredients in a dry kettle. The water was blended with the dry mixture and any lumps that were formed were dispersed. The glucose and the fat are then added. The mixture is strained to remove any lumps prior to sending the material into the homogenizer as in Example 1. Caramel was cooked according to the remaining procedure of Example 1. A caramel was obtained which had grainy mouth feel somewhat soft and plastic.

It is noted that insufficient whey protein concentrate and too much dry whey was present as well as too much lactose. These factors could explain the failure to prepare an acceptable caramel.

The invention is defined in the claims which follow. What is claimed is:

1. A milk solids replacer for caramels consisting essentially of:
   (a) from about 35% to about 45% by weight dry whey solids;
   (b) from about 8% to about 12% by weight sodium or calcium caseinate; and
   (c) whey protein concentrate having from about 24% to about 40% protein based on the total weight of the concentrate in an amount sufficient to provide the remainder and to provide whey protein in an amount of from about 13.75% to about 17.25% by weight, said whey protein concentrate being prepared by processing whey to concentrate the protein therein or by diluting a whey protein concentrate having a protein content higher than 40%;

all percentages, unless otherwise specified, being by weight based on the total combined weight of said dry whey solids, said caseinate and said concentrate.

2. The milk solids replacer as recited in claim 1 which further includes an anti-foamingly effective amount of a food grade emulsifier.

3. The caramel as recited in claim 2 wherein said emulsifier is present in an amount of from about 1% to about 5% by weight based on the total weight of said dry whey solids, said caseinate, said concentrate and said emulsifier.

4. A milk solids replacer for caramel comprising:
(a) from about 45% to about 55% by weight of a whey protein concentrate having approximately 31% protein by weight based on the total weight of the concentrate;
(b) dried whey solids in an amount of from about 38% to about 42%;
(c) sodium or calcium caseinate in an amount of from about 8% to about 12% by weight, and
(d) from about 1% to about 5% by weight of a food grade emulsifier, all percentages being by weight based on the total combined weight of said concentrate, said dry whey solids, said caseinate and said emulsifier.

5. The milk replacer as recited in claim 4 wherein said whey protein concentrate is present in amount of about 47% and said caseinate is present in an amount of about 10%.

6. The milk replacer as recited in claim 5 wherein the food grade emulsifier is present in an amount of from about 3% to about 5%.

7. A caramel normally prepared from milk solids, sucrose, dextrose, fat and water which comprises as a replacement for said milk solids a milk solids replacer consisting essentially of:
(a) from about 35% to about 45% by weight dry whey solids,
(b) from about 8% to about 12% by weight sodium or calcium caseinate; and
(c) whey protein concentrate having from about 24% to about 40% protein based on the total weight of the concentrate in an amount sufficient to provide the remainder and to provide whey protein in an amount of from about 13.75% to about 17.25% by weight, said whey protein concentrate being prepared by processing whey to concentrate the protein therein or by diluting a whey protein concentrate having a protein content higher than 40%;
all percentages, unless otherwise specified, being by weight based on the total combined weight of said dry whey solids, said caseinate and said concentrate.

8. The caramel as recited in claim 7 wherein said caseinate is sodium caseinate.

9. A process for preparing caramels from milk solids, sucrose, dextrose, fat and water which comprises replacing said milk solids with a milk solids replacer consisting essentially of:
(a) from about 35% to about 45% by weight dry whey solids;
(b) from about 8% to about 12% by weight sodium or calcium caseinate; and
(c) whey protein concentrate having from about 24% to about 40% protein based on the total weight of the concentrate in an amount sufficient to provide the remainder and to provide whey protein in an amount of from about 13.75% to about 17.25% by weight, said whey protein concentrate being prepared by processing whey to concentrate the protein therein or by diluting a whey protein concentrate having a protein content higher than 40%;
all percentages, unless otherwise specified, being by weight based on the total combined weight of said dry whey solids, said caseinate, and said concentrate.

10. A milk solids replacer for caramels comprising:
(a) from about 35% to about 45% by weight dry whey solids;
(b) from about 8% to about 12% by weight sodium or calcium caseinate; and
(c) whey protein concentrate having a concentration of whey protein of about 31% by weight based on the total weight of the concentrate and which is used in an amount of from about 45% to about 55%, said whey protein concentrate having about 31% protein being prepared by processing whey to concentrate the protein therein or by diluting a whey protein concentrate having a protein content higher than about 31%, all percentages, unless otherwise stated, being by weight based on the total combined weight of said dry whey solids, said caseinate and said concentrate.

11. The milk solids replacer as recited in claim 10, wherein said concentrated whey protein is present in an amount of approximately 47%, said whey solids are present in an amount of approximately 43%, and said caseinate is present in an amount of about 10%.

12. The milk solids replacer as recited in claim 10, wherein said dry whey solids are dried sweet whey solids.

13. The milk solids replacer as recited in claim 10, wherein the whey protein concentrate is derived by gel filtration separation or ultrafiltration of clarified whey.

14. The milk solids replacer as recited in claim 10, which further includes in an anti-foamingly effective amount of a food grade emulsifier.

15. The milk solids replacer as recited in claim 14 wherein said food grade emulsifier is used in an amount of from about 1 to about 5% by weight based on the combined weight of said dry whey solids, said caseinate, said concentrate and said emulsifier.

16. The milk solids replacer as recited in claim 14 wherein said food grade emulsifier is a mono and diglyceride of a fatty acid.

17. The milk solids replacer as recited in claim 16, wherein said dry whey solids are present in an amount of from about 38% to about 42% by weight.

18. The milk solids replacer as recited in claim 10, wherein said caseinate is sodium caseinate.

19. A process for preparing caramels from milk solids, sucrose, dextrose, fat and water which comprises replacing said milk solids with a milk solids replacer comprising:
(a) from about 35% to about 45% by weight dry whey solids;
(b) sodium or calcium caseinate in an amount of from about 8% to about 12% by weight sodium or calcium caseinate; and
(c) whey protein concentrate having a concentration of whey protein of about 31% by weight based on the total weight of the concentrate and which is used in an amount of from about 45% to about 55%, said whey protein concentrate having about 31% protein being prepared by processing whey to concentrate the protein therein or by diluting a whey protein concentrate having a protein content higher than about 31%; all percentages, unless otherwise stated, being by weight based on the total combined weight of said dry whey solids, said caseinate, and said concentrate.

20. The process for preparing caramels as recited in claim 19 which includes the steps of blending the milk solids replacer with water and preheating the blend to a temperature from about 55° C. to about 72° C. prior to adding the remaining ingredients of the caramel and cooking to reduce initial foaming.

21. The process as recited in claim 19 wherein said replacer further includes a food grade emulsifier in an anti-foamingly effective amount.

22. The process as recited in claim 21 wherein said emulsifier is present in an amount of from about 1% to about 5% by weight based on the total combined weight of said dry whey solids, said caseinate, said concentrate and said emulsifier.

23. The process as recited in claim 19 wherein said concentrate is present in an amount of about 47%, said dry whey solids are present in an amount of from about 38% to 42%, said caseinate is present in an amount of about 10%, and which further includes a food grade emulsifier in an amount of from about 1% to about 5%, all percentages being by weight based on the total combined weight of said dry whey solids, said caseinate, said concentrate and said emulsifier.

24. The process as recited in claim 19 wherein said caseinate is sodium caseinate.

25. A caramel normally prepared from milk solids, sucrose, dextrose, fat and water which comprises as a replacement for said milk solids a milk solids replacer comprising:

(a) from about 35% to about 45% by weight dry whey solids,
(b) from about 8% to about 12% by weight sodium or calcium caseinate; and
(c) whey protein concentrate having a concentration of whey protein of about 31% by weight based on the total weight of the concentrate and which is used in an amount of from about 45% to about 55%, said whey protein concentrate having a protein content of about 31% being prepared by processing whey to concentrate the protein therein or diluting a whey protein concentrate having a protein content higher than about 31%, all percentages, unless otherwise stated, being by weight based on the total combined weight of said dry whey solids, said caseinate and said concentrate.

26. The caramel as recited in claim 25 wherein said replacer further includes a food grade emulsifier in an anti-foamingly effective amount.

27. The caramel as recited in claim 26 wherein said emulsifier is present in an amount of from about 1% to about 5% by weight on the total weight of said dry whey solids, said caseinate, said concentrate and said emulsifier.

28. The caramel as recited in claim 25 wherein said concentrate is present in an amount of about 47%, said dry whey solids are present in an amount of from about 38% to 42%, said caseinate is present in an amount of from about 10% and which further includes a food grade emulsifier in an amount of from about 1% to about 5%, all percentages being by weight based on the total combined weight of said dry whey solids, said caseinate, said concentrate and said emulsifier.

* * * * *

UNITED STATES PATENT AND TRADEMARK OFFICE
CERTIFICATE OF CORRECTION

PATENT NO. : 4,269,864
DATED : May 26, 1981
INVENTOR(S) : Dominick J. Chirafisi
Nicholas Melachouris It is certified that error appears in the above—identified patent and that said Letters Patent is hereby corrected as shown below:

Col. 4, line 36 - change "fromm" to "from".

Col. 4, line 63 - change "weightbased" to "weight based".

Col. 5, line 57 - change "carmelization" to "caramelization".

Col. 10, line 33 - change "when" to "whey".

Col. 14, line 22 - change "weight on" to "weight based on".

Signed and Sealed this

Eighth Day of September 1981

[SEAL]

Attest:

Attesting Officer

GERALD J. MOSSINGHOFF

Commissioner of Patents and Trademarks